United States Patent
Rudolph

(10) Patent No.: US 8,207,683 B2
(45) Date of Patent: Jun. 26, 2012

(54) BUCK CONVERTER FOR MAKING POWER AVAILABLE TO AT LEAST ONE LED

(75) Inventor: Bernd Rudolph, Forstern (DE)

(73) Assignee: OSRAM AG, Munich (DE)

(*) Notice: Subject to any disclaimer, the term of this patent is extended or adjusted under 35 U.S.C. 154(b) by 199 days.

(21) Appl. No.: 12/812,960

(22) PCT Filed: Jan. 18, 2008

(86) PCT No.: PCT/EP2008/050581
§ 371 (c)(1),
(2), (4) Date: Jul. 15, 2010

(87) PCT Pub. No.: WO2009/089919
PCT Pub. Date: Jul. 23, 2009

(65) Prior Publication Data
US 2011/0050129 A1    Mar. 3, 2011

(51) Int. Cl.
*G05F 1/00* (2006.01)
*H02M 3/335* (2006.01)

(52) U.S. Cl. ........ 315/297; 315/291; 315/247; 315/307; 363/21.13; 363/21.18

(58) Field of Classification Search .......... 315/297, 315/291, 247, 223, 224, 127, 307; 363/21.12, 363/21.18, 221
See application file for complete search history.

(56) References Cited

U.S. PATENT DOCUMENTS

| 3,500,127 A | 3/1970 | Schiff |
| 4,823,023 A | 4/1989 | Shimpo et al. |
| 8,120,270 B2* | 2/2012 | Rudolph ................. 315/247 |
| 2003/0085749 A1 | 5/2003 | Xu et al. |
| 2009/0231552 A1* | 9/2009 | Huber et al. ................ 353/85 |
| 2010/0073965 A1* | 3/2010 | Niedermeier et al. ........ 363/18 |
| 2011/0096574 A1* | 4/2011 | Huang .................. 363/21.18 |

FOREIGN PATENT DOCUMENTS
EP    1868284 A1    12/2007

OTHER PUBLICATIONS
International Search Report of PCT/EP2008/050581 dated Jan. 10, 2008.

* cited by examiner

Primary Examiner — Vibol Tan

(57) ABSTRACT

A buck converter for providing a current for an LED includes an input for connection of a DC voltage source; an output for connection of the LED; and a Buck diode, a Buck inductor and a Buck main switch which has a control electrode, a working electrode and a reference electrode. The diode and the main switch are coupled in series, wherein the connecting point between the diode and the main switch is coupled to the second output connection. The converter includes: an auxiliary winding which is coupled to the inductor and has a connection which is coupled to the second input connection and a connection which is coupled to the control electrode of the switch, wherein the auxiliary winding is coupled to the inductor such that, when current is flowing through the switch, a current is provided through the auxiliary winding to the control electrode of the switch.

14 Claims, 2 Drawing Sheets

BUCK CONVERTER FOR MAKING POWER AVAILABLE TO AT LEAST ONE LED

RELATED APPLICATIONS

The present application is a national stage entry according to 35 U.S.C. §371 of PCT application No.: PCT/EP2008/050581 filed on Jan. 18, 2008.

TECHNICAL FIELD

Various embodiments provide a Buck converter for providing a current for at least one LED having an input having a first and a second input connection for connection of a DC voltage source, an output having a first and a second output connection for the connection of the at least one LED, and a Buck diode, a Buck inductor and a Buck main switch, which has a control electrode, a working electrode and a reference electrode.

BACKGROUND

As LEDs are being introduced into wide areas of general lighting, there is a major requirement for simple and low-cost power supply circuits for these components. One converter circuit which is known for operation of LEDs for mains applications is the so-called flyback converter. Furthermore, there are now a multiplicity of in particular integrated circuits for Buck or boost converters, for example the MXHV9910 control IC from the company Micronix. These embodiments have the disadvantage that they all require quite considerable complexity and the use of expensive components. By way of example, the switch in a flyback converter for the European mains voltage must have a withstand voltage of at least 700 V. The costs that this results in frequently exceed the budget provided for use in mass-produced products.

SUMMARY

Various embodiments develop a Buck converter of the type mentioned initially such that it can be produced at extremely low cost.

Various embodiments are based on the discovery that very low-cost bipolar transistors can be used, for example as represented by the MPSA42 type known from the video field, in which currents required for a power LED on the one hand still have only a low current gain but on the other hand have to be switched off at a defined time, in order that a defined current is likewise produced for the LED.

The invention is now furthermore based on the load on the switch being reduced by coupling the Buck diode and the Buck main switch in series between the first and the second input connection, wherein the connecting point between the Buck diode and the Buck main switch is coupled to the second output connection. The first connection of the Buck inductor is coupled to the first input connection and the second connection of the Buck inductor is coupled to the first output connection. The problem of the low current gain in the range of the currents which are required to operate power LEDs is solved according to the invention in that a measure was taken to provide an adequate base current for the Buck main switch. For this purpose, the Buck converter furthermore includes a first auxiliary winding, which is coupled to the Buck inductor and has a first connection which is coupled to the second input connection and a second connection which is coupled to the control electrode of the Buck main switch, wherein the first auxiliary winding is coupled to the Buck inductor such that, when current is flowing through the Buck main switch, a current is provided through the first auxiliary winding to the control electrode of the Buck main switch.

These measures make it possible to provide an extremely simple and low-cost Buck converter design. They furthermore allow operation in the critical conduction mode, in which essentially only switching-off losses occur for the Buck main switch.

In one preferred embodiment, the Buck converter furthermore includes a current measurement resistor which is coupled in series with the Buck main switch, in particular between the connecting point defined by the Buck diode and the Buck main switch and the second input connection, and a first auxiliary switch for switching off the buck main switch, wherein the first auxiliary switch has a control electrode, a working electrode and a reference electrode, wherein the reference electrode of the first auxiliary switch is coupled to the second input connection and wherein the control electrode of the first auxiliary switch is coupled to the current measurement resistor. This arrangement results in a voltage being produced across the current measurement resistor when a predeterminable maximum current through the Buck main switch is reached, which voltage leads to the first auxiliary switch being switched on, with the process of switching on the first auxiliary switch leading to the Buck main switch being switched off.

Preferably, the Buck converter furthermore includes a timing element which is coupled between the current measurement resistor and the control electrode of the first auxiliary switch. This makes it possible to ensure that the first auxiliary switch remains switched off even though the current produced at its control electrode is already falling because of the Buck main switch having been switched off. By way of example, a preferred time constant is in the order of magnitude between 0.2 and 10 μs, preferably 11 μs.

Furthermore, preferably, a first non-reactive resistor is coupled between the second connection of the first auxiliary winding and the control electrode of the Buck main switch. In this case, furthermore, the connection point between the first non-reactive resistor and the control electrode of the Buck main switch is preferably coupled via a second non-reactive resistor to the second input connection. The controlled path through the Buck main switch is therefore terminated with a relatively low impedance, and is therefore insensitive to injected disturbances.

Furthermore, the control electrode of the Buck main switch is preferably coupled to the working electrode of the first main switch.

In a further preferred development, the Buck converter can furthermore have a second auxiliary switch for starting the Buck converter, wherein the second auxiliary switch has a control electrode, a working electrode and a reference electrode, wherein the reference electrode of the second auxiliary switch is coupled to the first input connection, wherein the control electrode of the second auxiliary switch is coupled via a non-reactive resistor to the second input connection. This measure ensures that the second auxiliary switch is switched on as soon as a DC voltage source is connected between the first and the second input connection.

Preferably, the working electrode of the second auxiliary switch is coupled via a non-reactive resistor to the working electrode of the first auxiliary switch. As soon as the second auxiliary switch is switched on, a current is then provided to the control electrode of the Buck main switch via this non-reactive resistor, thus likewise switching the Buck main switch on. The current produced by the first auxiliary winding and the current flowing via the switched-on second auxiliary switch therefore flow into the control electrode of the Buck main switch.

Preferably, the Buck converter furthermore includes a second auxiliary winding, which is coupled to the Buck inductor and has a first connection which is coupled to the first input connection and a second connection which is coupled to the control electrode of the second auxiliary switch. In this case, preferably, a non-reactive resistor, preferably a non-reactive resistor connected in series with a diode, is coupled between the second connection of the second auxiliary winding and the control electrode of the second auxiliary switch. In this case, in particular, the second auxiliary winding is coupled to the Buck inductor such that, during the phase in which the Buck main switch is switched off, or the demagnetization phase of the Buck inductor, a current is provided to the control electrode of the second auxiliary switch such that the second auxiliary switch is switched off. This makes it possible to prevent any current flowing through the non-reactive resistor which couples the working electrode of the second auxiliary switch to the working electrode of the first auxiliary switch, as a result of which a power loss occurs in this non-reactive resistor only in the brief phases in which the Buck main switch is switched on, and this resistor is operated with virtually no losses during the long phases in which the Buck main switch is switched off.

In order to reduce the ripple on the current provided to the at least one LED, at least one capacitor is furthermore preferably coupled between the first and the second output connection.

Further preferred embodiments result from the dependent claims.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
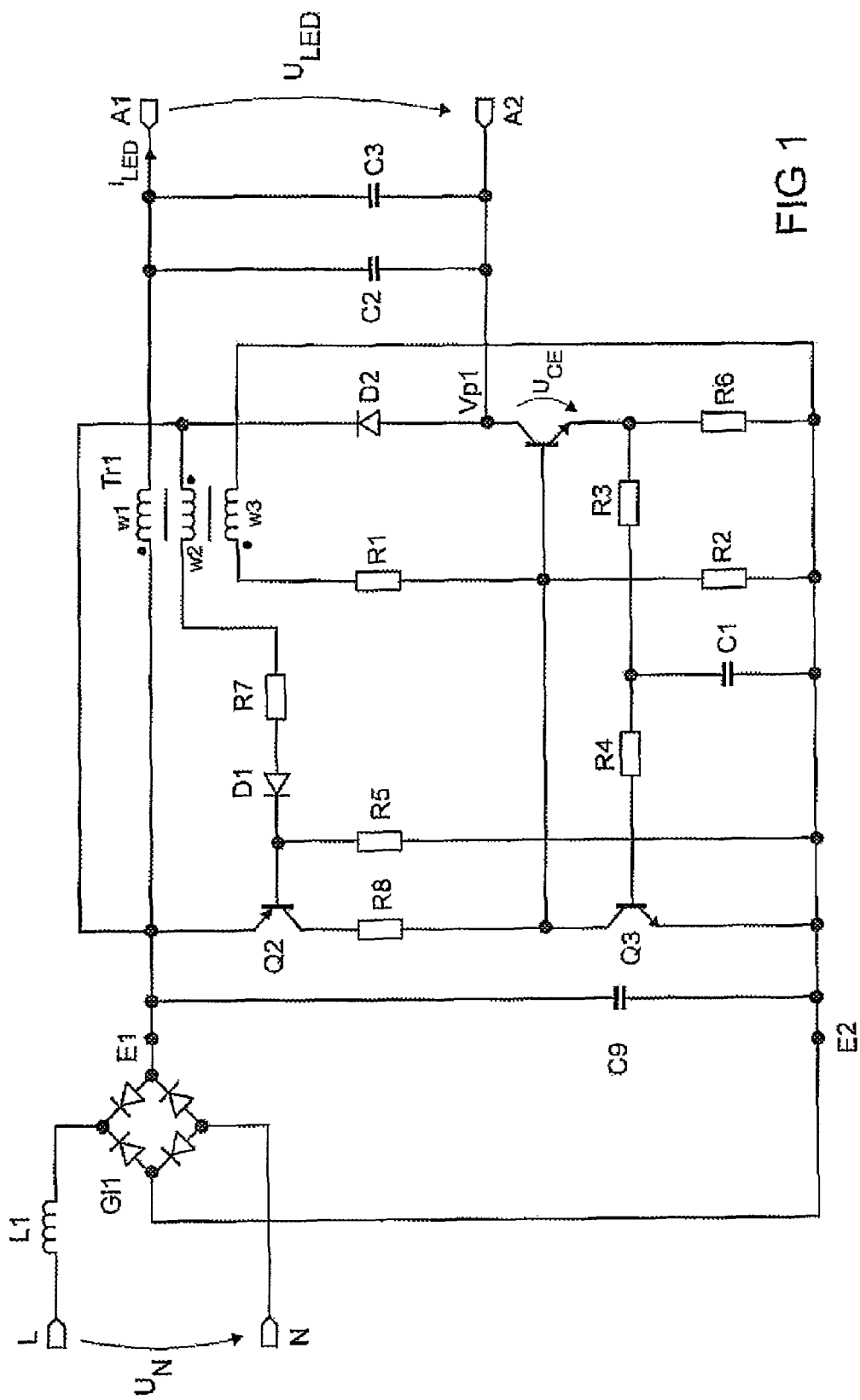
FIG. 1 shows a schematic illustration of one exemplary embodiment of a Buck converter according to the invention.

FIG. 1 shows a schematic illustration of one exemplary embodiment of a Buck converter according to the invention. This Buck converter has a first input connection E1 and a second input connection E2, which are connected to mains connections L, N via a rectifier GL1. An inductance L1 which is arranged between the mains connection L and the rectifier GL1 is used to limit the inrush current and for radio suppression. A capacitor C9 is provided in order to buffer the rectified mains voltage. A series circuit including a Buck diode D2 and a Buck main switch Q1 is coupled in the normal manner between the input connections E1 and E2. A Buck inductor is coupled between the first input connection E1 and a first output connection A1, with the Buck inductor in the present case being in the form of a first winding w1 of a transformer TR1, which furthermore has a first auxiliary winding w2 and a second auxiliary winding w3. The connecting point VP1 which is arranged between the Buck diode D2 and the Buck main switch Q1 is coupled to the second output connection A2 of the Buck converter. Two capacitors C2, C3 are coupled between the output connections A1, A2.

A non-reactive resistor R6 is arranged as a shunt between the emitter of the Buck main switch Q1 and the second input connection E2. The voltage which is dropped across this resistor R6 is passed via a timing element, which includes the non-reactive resistor R3 and the capacitor C1, and via a non-reactive resistor R4 to the base of a first auxiliary switch Q3, because the current through the Buck main switch Q1 falls to zero within approximately 200 to 300 ns after it has been switched off. This timing element makes it possible to ensure that the first auxiliary switch Q3 remains switched on for longer than would be the case if the voltage dropped across the resistor R6 were to be coupled directly to the base of the first auxiliary switch Q3, that is to say without the interposition of a timing element.

The control electrode of the Buck main switch Q1 is firstly coupled via a resistor R1 to the auxiliary winding w3, and secondly to the working electrode of the auxiliary switch Q3. Furthermore, the control electrode of the Buck main switch Q1 is thirdly coupled via a non-reactive resistor R2 to the second input connection E2. The reference electrode of a further auxiliary switch Q2 is coupled to the first input connection E1, and its working electrode is coupled via a non-reactive resistor R8 to the working electrode of the auxiliary switch Q3. The control electrode of the auxiliary switch Q2 is coupled on the one hand via a non-reactive resistor R5 to the second input connection E2, and on the other hand is coupled to the auxiliary winding w2 via a diode D1 and a non-reactive resistor R7 connected in series. In this case, the diode D1 acts as a starting diode when the mains voltage is too low, that is to say the switch Q2 is not switched on until the mains voltage reaches 160 to 170 V.

While the auxiliary winding w3 is wound in the same sense as the winding w1, the winding w2 is wound in the opposite sense to the winding w1.

With regard to the method of operation: after a mains voltage has been applied, a current flows via the input connection E2, the auxiliary winding w2, the non-reactive resistor R7, the diode D1 and the non-reactive resistor R5, and leads to the auxiliary transistor Q2 being switched on. A base current is thereby provided at the base of the Buck main switch Q1, leading to the Buck main switch Q1 being switched on. In this case, suitable design of the transformer TR1, in particular suitable design of the winding w3, ensures that the Buck main switch Q1 is supplied with an adequate base current even when the currents provided to the at least one LED are high. The auxiliary winding w3 makes a base current available for the Buck main switch Q1 precisely when this is required, and only then, to be precise when the Buck main switch Q1 is switched on. When the emitter current of the Buck main switch produces a voltage drop across the shunt R6 which is sufficient to switch the auxiliary switch Q3 on, the current provided by the auxiliary switch Q2 no longer flows to the control electrode of the Buck main switch Q1, but via the auxiliary switch Q3 to the input connection E2. The Buck main switch Q1 is therefore switched off.

In contrast to a flyback converter, the Buck main switch Q1 in the present case is loaded at most with the voltage applied between the input connections E1, E2. The circuit is normally designed such that the time $t_{off}$ for which it is switched off is approximately twenty times the time $t_{on}$ for which it is switched on. In one preferred exemplary embodiment, the time $t_{off}$ for which it is switched off is approximately 40 μs, and the time $t_{on}$ for which it is switched on is correspondingly 2 μs.

The feedback windings w2 and w3 accordingly ensure that the Buck main switch Q1 and the auxiliary switch Q2 are reliably switched off until the Buck inductor TR1, w1 is completely demagnetized. The Buck main switch Q1 is therefore operated in the critical conduction mode (transition mode), as a result of which it can be switched on with low losses in the next period, that is to say the current flowing through the Buck main switch Q1 is virtually zero at the switching-on time. The frequency of the triangular waveform current through the Buck inductor TR1, w1 is governed by the input mains voltage $U_N$ applied between the connections, the LED voltage $U_{LED}$ produced at the output, the inductance of the Buck inductor TR1, w1 and the limit value for the maximum LED current $I_{LED}$.

Figure 2:
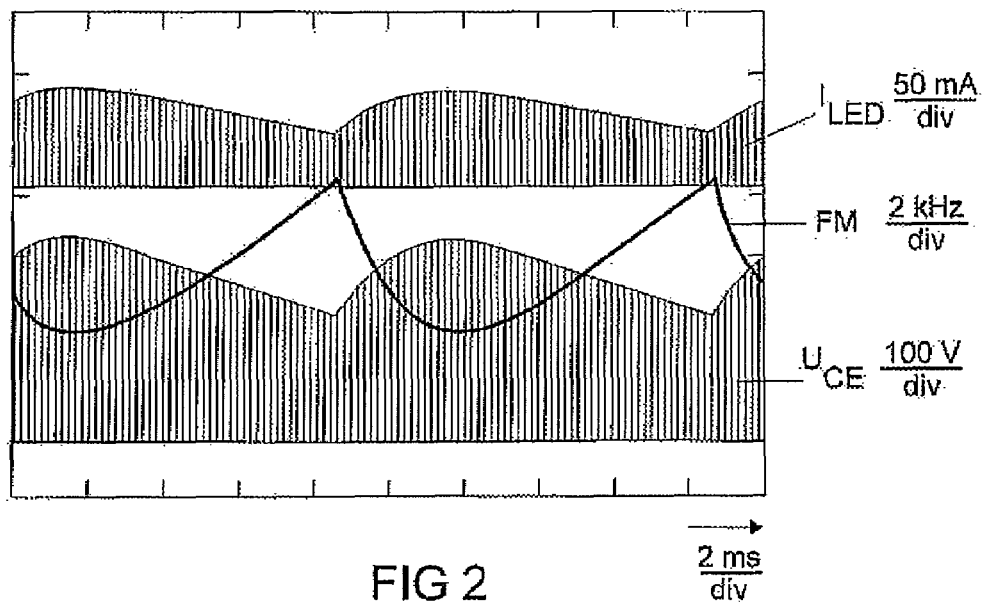
FIG. 2 shows the waveform of the collector-emitter voltage on the Buck main switch and of the current $I_{LED}$ provided to the at least one LED, with a first time resolution.

FIG. 2 shows the waveform of the envelope curve for the current $I_{LED}$, the collector-emitter voltage $U_{CE}$ of the Buck main switch Q1 as well as the frequency modulation for an exemplary embodiment which was produced with the dimensions indicated in FIG. 1. The minimum frequency is 23.12 kHz, and the maximum frequency is 28.16 kHz. Despite the fact that the Buck main switch Q1 is operated in the critical conduction mode, the current $I_{LED}$ never falls to zero because of the effect of the capacitors C2 and C3. In the present case, its minimum is about 60 mA, and its maximum 130 mA.

Figure 3:
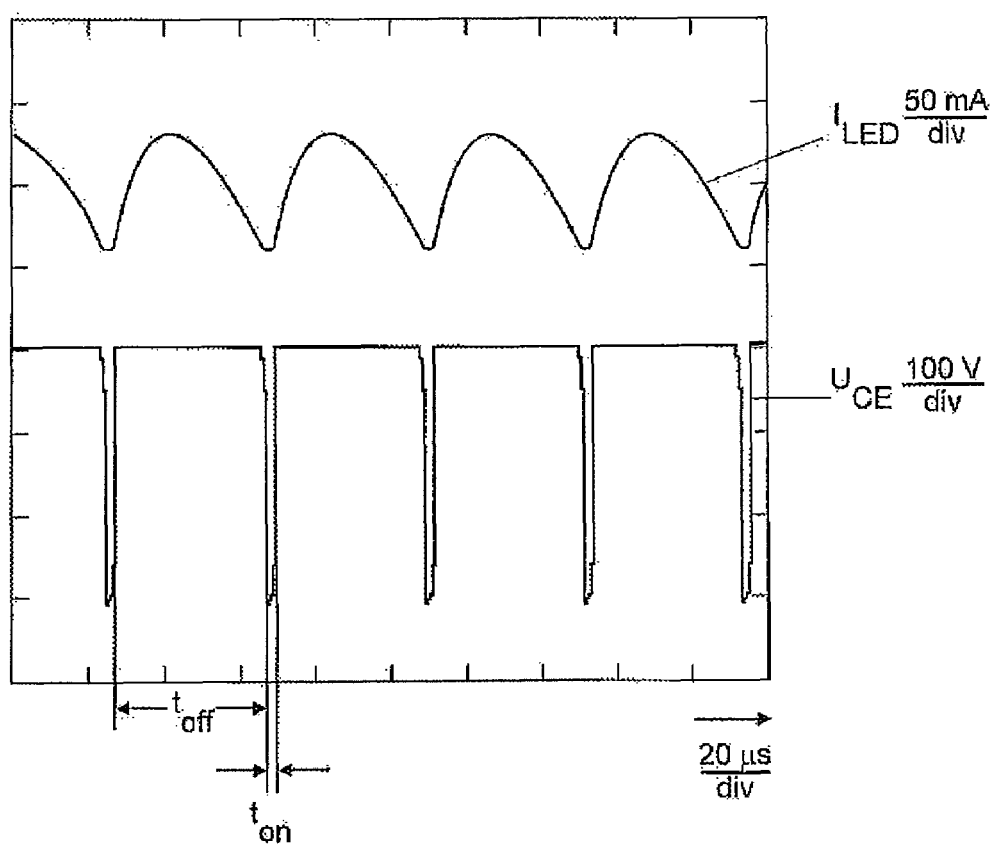
FIG. 3 shows the waveform of the collector-emitter voltage on the Buck main switch and of the current $I_{LED}$ provided to the at least one LED, with a second time resolution.

While the plot shown in FIG. 2 was produced with a resolution of 2 ms per time unit (=small boxes), the resolution in FIG. 3 is 20 μs per time unit. This shows the waveform of the current $I_{LED}$ and of the collector-emitter voltage $U_{CE}$ of the Buck main switch Q1. As can be seen well from the waveform of the voltage $U_{ce}$, the time $t_{on}$ for which the Buck main switch Q1 is switched on is about 2 μs, while the time $t_{off}$ for which it is switched off is about 38 μs. The distorted triangular shape of the waveform of the current $I_{LED}$ is a result of the effect of the capacitors C2 and C3.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A buck converter for providing a current for at least one light emitting diode, the buck converter comprising:
an input having a first and a second input connection for connection of a DC voltage source;
an output having a first and a second output connection for connection of the at least one light emitting diode; and
a Buck diode, a Buck inductor and a Buck main switch which has a control electrode, a working electrode and a reference electrode;
wherein
the Buck diode and the Buck main switch are coupled in series between the first and the second input connection, wherein the connecting point between the Buck diode and the Buck main switch is coupled to the second output connection;
wherein the first connection of the Buck inductor is coupled to the first input connection and the second connection of the Buck inductor is coupled to the first output connection;
wherein the Buck converter furthermore comprises:
a first auxiliary winding which is coupled to the Buck inductor and has a first connection which is coupled to the second input connection and a second connection which is coupled to the control electrode of the Buck main switch, wherein the first auxiliary winding is coupled to the Buck inductor such that, when current is flowing through the Buck main switch, a current is provided through the first auxiliary winding to the control electrode of the Buck main switch.

2. The Buck converter as claimed in claim 1,
wherein the Buck converter furthermore comprises:
a current measurement resistor which is coupled in series with the Buck main switch, and
a first auxiliary switch configured to switch off the buck main switch, wherein the first auxiliary switch has a control electrode, a working electrode and a reference electrode, wherein the reference electrode of the first auxiliary switch is coupled to the second input connection and wherein the control electrode of the first auxiliary switch is coupled to the current measurement resistor.

3. The Buck converter as claimed in claim 2,
wherein the Buck converter furthermore comprises a timing element which is coupled between the current measurement resistor and the control electrode of the first auxiliary switch.

4. The Buck converter as claimed in claim 1,
wherein a first non-reactive resistor is coupled between the second connection of the first auxiliary winding and the control electrode of the Buck main switch.

5. The Buck converter as claimed in claim 4,
wherein the connection point between the first non-reactive resistor and the control electrode of the Buck main switch is coupled via a second non-reactive resistor to the second input connection.

6. The Buck converter as claimed in claim 2,
wherein the control electrode of the Buck main switch is coupled to the working electrode of the first main switch.

7. Buck converter according to claim 1,
wherein the Buck converter furthermore comprises:
a second auxiliary switch for starting the Buck converter, wherein the second auxiliary switch has a control electrode, a working electrode and a reference electrode, wherein the reference electrode of the second auxiliary switch is coupled to the first input connection, wherein the control electrode of the second auxiliary switch is coupled via a non-reactive resistor to the second input connection.

8. The Buck converter as claimed in claim 7,
wherein the working electrode of the second auxiliary switch is coupled via a non-reactive resistor to the working electrode of the first auxiliary switch.

9. The Buck converter as claimed in claim 1,
wherein the Buck converter furthermore comprises:
a second auxiliary winding, which is coupled to the Buck inductor and has a first connection which is coupled to the first input connection and a second connection which is coupled to the control electrode of the second auxiliary switch.

10. The Buck converter as claimed in claim 9, wherein a non-reactive resistor, is coupled between the second connection of the second auxiliary winding and the control electrode of the second auxiliary switch.

11. The Buck converter as claimed in claim 9, wherein the second auxiliary winding is coupled to the Buck inductor such that, during the demagnetization phase of the Buck inductor, a current is provided to the control electrode of the second auxiliary switch such that the second auxiliary switch is switched off.

12. The Buck converter as claimed in claim 1, wherein at least one capacitor is coupled between the first output connection and the second output connection.

13. The Buck converter as claimed in claim 2, wherein the current measurement resistor is coupled in series with the Buck main switch between the connecting point defined by the Buck diode and the Buck main switch and the second input connection.

14. The Buck converter as claimed in claim 10, wherein the non-reactive resistor is connected in series with a diode.

* * * * *